(12) United States Patent
Tsuruoka

(10) Patent No.: US 10,260,439 B2
(45) Date of Patent: Apr. 16, 2019

(54) CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventor: Kazuki Tsuruoka, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/845,397

(22) Filed: Dec. 18, 2017

(65) Prior Publication Data

US 2018/0179973 A1 Jun. 28, 2018

(30) Foreign Application Priority Data

Dec. 26, 2016 (JP) .................. 2016-252114

(51) Int. Cl.
*F02D 41/02* (2006.01)
*F01N 9/00* (2006.01)
(Continued)

(52) U.S. Cl.
CPC .......... *F02D 41/0245* (2013.01); *F01N 9/00* (2013.01); *F02D 41/008* (2013.01);
(Continued)

(58) Field of Classification Search
CPC .............. F01N 9/00; F01N 2900/1404; F01N 2900/08; F01N 2900/1602; F02D 41/0245;
(Continued)

(56) References Cited

U.S. PATENT DOCUMENTS 7,950,225 B2 * 5/2011 Komatsu ............... F02D 41/028
60/285
9,169,755 B2 * 10/2015 Ulrey ...................... F01N 3/04
(Continued)

FOREIGN PATENT DOCUMENTS

JP 2012-57492 A 3/2012
JP 2014-185554 A 10/2014

*Primary Examiner* — Audrey K Bradley
*Assistant Examiner* — Dapinder Singh
(74) *Attorney, Agent, or Firm* — Oliff PLC

(57) ABSTRACT

A control apparatus for an internal combustion engine executes a detection process upon satisfaction of all detection preconditions including a stopped condition that a temperature-increasing process has been stopped; determines Whether all the detection preconditions except the stopped condition are satisfied, during the temperature-increasing process; executes a gradually-changing-and-stopping process of stopping the temperature-increasing process by gradually changing the air-fuel ratios in the cylinders to a target air-fuel ratio set based on an operation state of the internal combustion engine after stop of the temperature-increasing process, when a negative determination is made and a temperature-increasing process stop request has been issued; and executes a promptly-stopping process of stopping the temperature-increasing process by changing the air-fuel ratios in the cylinders to the target air-fuel ratio within a shorter time period than that of the gradually-changing-and-stopping process, when an affirmative determination is made and a temperature-increasing process stop request has been issued.

4 Claims, 6 Drawing Sheets

(51) Int. Cl.
*F02D 41/14* (2006.01)
*F02D 41/00* (2006.01)

(52) U.S. Cl.
CPC ....... *F02D 41/025* (2013.01); *F02D 41/0255* (2013.01); *F02D 41/1446* (2013.01); *F02D 41/1456* (2013.01); *F02D 41/1495* (2013.01); *F01N 2900/08* (2013.01); *F01N 2900/1404* (2013.01); *F01N 2900/1602* (2013.01); *Y02T 10/26* (2013.01)

(58) Field of Classification Search
CPC .. F02D 41/1495; F02D 41/025; F02D 41/008; F02D 41/1456; F02D 41/1446; F02D 41/0255; Y02T 10/26
USPC .......................................... 60/274, 286, 295
See application file for complete search history.

(56) References Cited

U.S. PATENT DOCUMENTS

| | | | |
|---|---|---|---|
| 9,982,614 B2* | 5/2018 | Hayashita | F01N 3/101 |
| 2011/0192374 A1* | 8/2011 | Ulrey | F02D 41/008 |
| | | | 123/319 |
| 2012/0225752 A1* | 9/2012 | Gonze | F01N 3/2026 |
| | | | 477/100 |
| 2014/0288802 A1 | 9/2014 | Katayama et al. | |
| 2014/0366508 A1* | 12/2014 | Ulrey | F01N 3/04 |
| | | | 60/274 |
| 2015/0128574 A1* | 5/2015 | Hayashita | F02D 41/1441 |
| | | | 60/285 |
| 2016/0194007 A1* | 7/2016 | Furuya | B60W 10/02 |
| | | | 477/174 |
| 2016/0265466 A1* | 9/2016 | Suzuki | F02D 41/2461 |

* cited by examiner

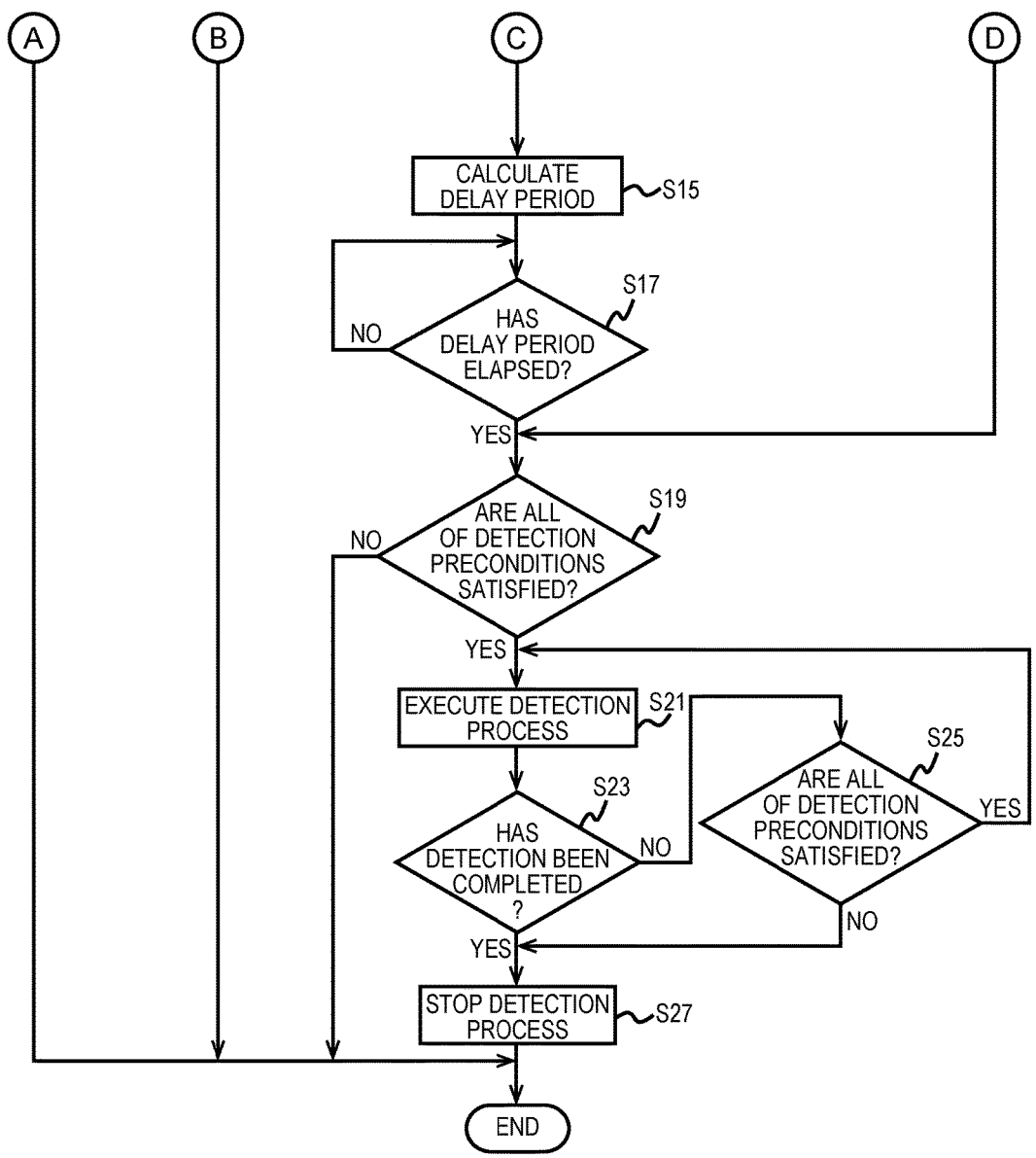

CONTROL APPARATUS FOR INTERNAL COMBUSTION ENGINE

INCORPORATION BY REFERENCE

The disclosure of Japanese Patent Application No. 2016-252114 filed on Dec. 26, 2016 including the specification, drawings and abstract is incorporated herein by reference in its entirety.

BACKGROUND

1. Technical Field

The disclosure relates to a control apparatus for an internal combustion engine.

2. Description of Related Art

A temperature-increasing process of increasing the temperature of a catalyst to an appropriate temperature is executed in some cases in order to suppress an increase in the amount of exhaust emission from an internal combustion engine. Examples of the temperature-increasing process include control of adjusting an air-fuel ratio in at least one cylinder of a plurality of cylinders of an internal combustion engine to a rich air-fuel ratio and adjusting a target air-fuel ratio for the remaining cylinders to a lean air-fuel ratio (see, for example, Japanese Unexamined Patent Application Publication No. 2012-057492).

If a malfunction occurs in, for example, a fuel injection valve for any one of cylinders, the degree of variation among air-fuel ratios in the cylinders may increase, resulting in an increase in the amount of exhaust emission. In view of this, there is a technology in which a detection process of detecting a degree of variation among air-fuel ratios in cylinders is executed (for example, see Japanese Unexamined Patent Application Publication No. 2014-185554).

SUMMARY

The above-described temperature-increasing process is a process of intentionally increasing the degree of variation among the air-fuel ratios in the cylinders. Therefore, when the detection process is executed during execution of the temperature-increasing process, there is a possibility that it will be determined, based on the high degree of variation among the air-fuel ratios, that some sort of malfunction has occurred in the internal combustion engine. In order to reduce such a possibility, a condition that the temperature-increasing process has been stopped (i.e., a condition that the temperature-increasing process is not being executed) may be included in detection. preconditions for executing the detection process.

When a stop request to stop the temperature-increasing process has been issued, a torque shock may occur if the air-fuel ratio in each cylinder is immediately changed from a rich air-fuel ratio or a lean air-fuel ratio to a target air-fuel ratio that is set based on an operation state of the internal combustion engine during stop of the temperature-increasing process. In view of this, a gradually-changing-and-stopping process may be employed. The gradually-changing-and-stopping process is a process of stopping the temperature-increasing process by gradually changing the air-fuel ratio in each cylinder from a rich air-fuel ratio or a lean air-fuel ratio to the target air-fuel ratio.

During execution of the temperature-increasing process, all detection preconditions except the condition that the temperature-increasing process has been stopped are satisfied in some cases. In such a case, the detection process can be executed as soon as the temperature-increasing process is stopped by changing the air-fuel ratio in each cylinder to the target air-fuel ratio. Even in such a case, if the gradually-changing-and-stopping process is executed in a uniform manner, a time period from when a stop request to stop the temperature-increasing process is issued until when the temperature-increasing process is actually stopped is likely to be long. This may cause a possibility that the detection process cannot be started promptly and an execution time period of the detection process may be insufficient.

The disclosure provides a control apparatus for an internal combustion engine, the control apparatus being configured to secure a sufficiently long execution time period of a detection process of detecting a degree of variation among air-fuel ratios in cylinders.

An aspect of the disclosure relates to a control apparatus for an internal combustion engine. The control apparatus includes a temperature-increasing processing unit, a detection processing unit, a determination processing unit, a gradually-changing-and-stopping processing unit, and a promptly-stopping processing unit. The temperature-increasing processing unit is configured to execute a temperature-increasing process that is a process of increasing a temperature of a catalyst configured to clean exhaust gas discharged from a plurality of cylinders of the internal combustion engine, by setting an air-fuel ratio in at least one cylinder of the plurality of cylinders to a rich air-fuel ratio that is lower than a stoichiometric air-fuel ratio, and setting an air-fuel ratio in the rest of the plurality of cylinders to a lean air-fuel ratio that is higher than the stoichiometric air-fuel ratio. The detection processing unit is configured to execute a detection process that is a process of detecting a degree of variation among the air-fuel ratios in the plurality of cylinders upon satisfaction of all of a plurality of detection preconditions including a condition that the temperature-increasing process has been stopped. The determination processing unit is configured to determine whether all the detection preconditions except the condition that the temperature-increasing process has been stopped are satisfied, during execution of the temperature-increasing process. The gradually-changing-and-stopping processing unit is configured to execute a gradually-changing-and-stopping process when the determination processing unit makes a negative determination and a request to stop the temperature-increasing process has been issued. The gradually-changing-and-stopping process is a process of stopping the temperature-increasing process by gradually changing the air-fuel ratios in the plurality of cylinders to a target air-fuel ratio that is set based on an operation state of the internal combustion engine after stop of the temperature-increasing process. The promptly-stopping processing unit is configured to execute a promptly-stopping process when the determination processing unit makes an affirmative determination and a request to stop the temperature-increasing process has been issued. The promptly-stopping process is a process of stopping the temperature-increasing process by changing the air-fuel ratios in the plurality of cylinders to the target air-fuel ratio within a shorter time period than a time period of the gradually-changing-and-stopping process.

The aspect of the disclosure may be defined as follows. The aspect of the disclosure relates to a control apparatus for an internal combustion engine. The control apparatus includes an electronic control unit. The electronic control unit is configured to: i) execute a temperature-increasing process that is a process of increasing a temperature of a catalyst configured to clean exhaust gas discharged from a plurality of cylinders of the internal combustion engine, by setting an air-fuel ratio in at least one cylinder of the plurality of cylinders to a rich air-fuel ratio that is lower than a stoichiometric air-fuel ratio, and setting an air-fuel ratio in the rest of the plurality of cylinders to a lean air-fuel ratio that is higher than the stoichiometric air-fuel ratio; ii) execute a detection process that is a process of detecting a degree of variation among the air-fuel ratios in the plurality of cylinders upon satisfaction of all of a plurality of detection preconditions, the plurality of detection preconditions including a condition that the temperature-increasing process has been stopped; iii) execute a determination process that is a process of determining whether all the detection preconditions except the condition that the temperature-increasing process has been stopped are satisfied, during execution of the temperature-increasing process; iv) execute a gradually-changing-and-stopping process when a negative determination is made in the determination process and a request to stop the temperature-increasing process has been issued, the gradually-changing-and-stopping process being a process of stopping the temperature-increasing process by gradually changing the air-fuel ratios in the plurality of cylinders to a target air-fuel ratio that is set based on an operation state of the internal combustion engine after stop of the temperature-increasing process; and v) execute a promptly-stopping process when an affirmative determination is made in the determination process and a request to stop the temperature-increasing process has been issued, the promptly-stopping process being a process of stopping the temperature-increasing process by changing the air-fuel ratios in the plurality of cylinders to the target air-fuel ratio within a shorter time period than a time period of the gradually-changing-and-stopping process.

When a request to stop the temperature-increasing process is issued in a state where all the detection preconditions except the condition that the temperature-increasing process has been stopped are satisfied, the detection process can be executed as soon as the temperature-increasing process is stopped. Therefore, the detection process can be started promptly by executing the promptly-stopping process. Thus, a sufficiently long execution time period of the detection process can be secured. When a request to stop the temperature-increasing process is issued in a state where at least one of all the detection preconditions except the condition that the temperature-increasing process has been stopped is unsatisfied, the detection process cannot be started immediately. Thus, the gradually-changing-and-stopping process is executed to stop the temperature-increasing process while reducing the occurrence of a torque shock.

The determination processing unit may be configured to determine whether all the detection preconditions except the condition that the temperature-increasing process has been stopped are satisfied during execution of the temperature-increasing process, and to determine whether a time period over which all the detection preconditions except the condition that the temperature-increasing process has been stopped are continuously satisfied during execution of the temperature-increasing process is equal to or longer than a prescribed time period.

The control apparatus may further include a calculation processing unit configured to calculate a delay period that is a time period from when the temperature-increasing process is stopped until when execution of the detection process is started. The calculation processing unit may be configured such that the delay period is longer as an air-fuel ratio parameter is larger. The air-fuel ratio parameter is a parameter correlated with at least one of a difference between the rich air-fuel ratio and the lean air-fuel ratio during execution of the temperature-increasing process and a difference between the target air-fuel ratio and one of the rich air-fuel ratio and the lean air-fuel ratio.

The calculation processing unit may be configured to calculate the delay period such that the delay period is longer as an adhesion amount parameter is larger. The adhesion parameter is a parameter correlated with an amount of fuel adhering to an inner wall surface of the internal combustion engine.

According to the disclosure, it is possible to provide the control apparatus for an internal combustion engine, the control apparatus being configured to secure a sufficiently long execution time period of the detection process of detecting a degree of variation among air-fuel ratios in the cylinders.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2B is a flowchart illustrating an example of control executed by an electronic control unit (ECU);

DETAILED DESCRIPTION OF EMBODIMENTS

Figure 1:
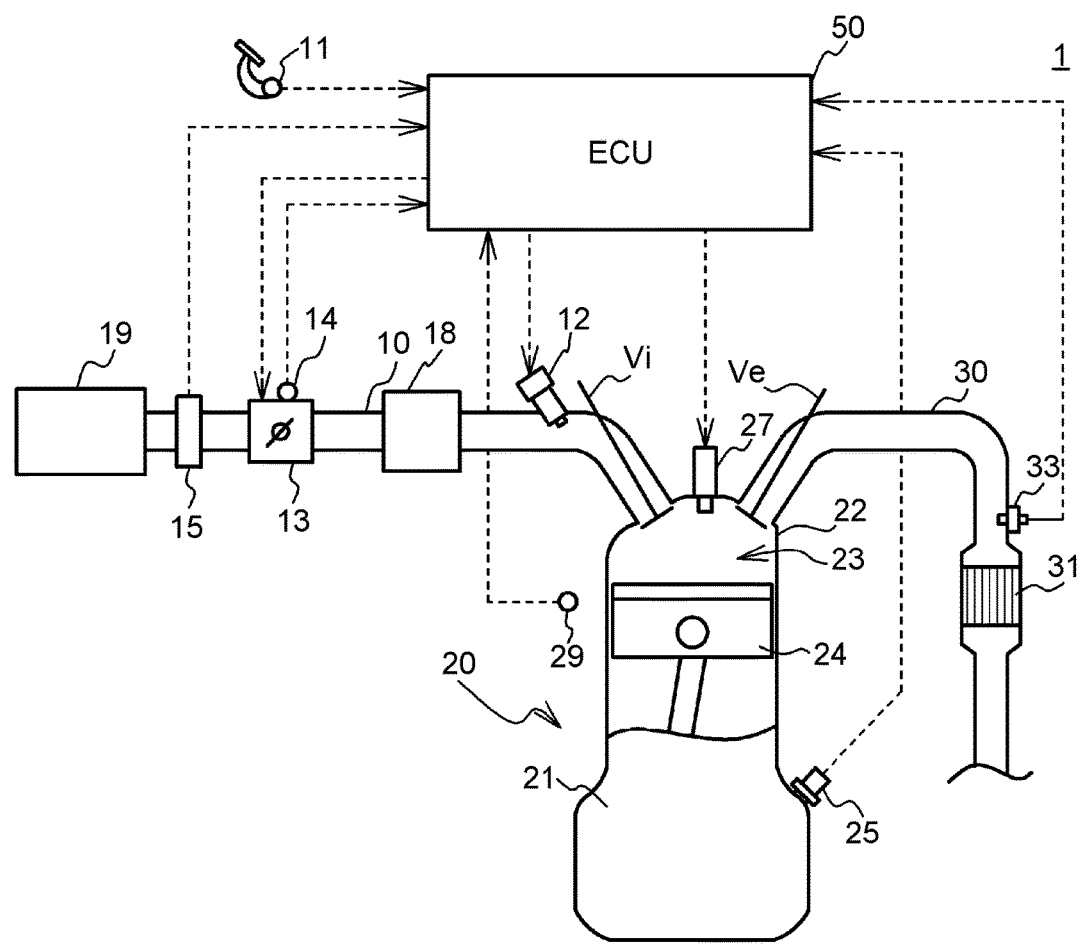
FIG. 1 is a schematic configuration diagram of an engine system.

FIG. 1 is a schematic configuration diagram of an engine system 1. As illustrated in FIG. 1, the engine system 1 includes a three-way catalyst 31 configured to clean exhaust gas discharged from an engine 20, and so forth. The engine 20 is configured such that an air-fuel mixture is burned in combustion chambers 23 in a cylinder head 22 disposed on a cylinder block 21 to cause pistons 24 to make a reciprocating motion. In the present embodiment, the engine 20 is an in-line four-cylinder engine. However, the engine 20 is not limited to an in-line four-cylinder engine as long as the engine 20 includes a plurality of cylinders.

Each cylinder is provided with an intake valve Vi and an exhaust valve Ve that are disposed in the cylinder head 22 of the engine 20. The intake valve Vi is configured to open and close an intake port, and the exhaust valve Ve is configured to open and close an exhaust port. Further, each cylinder is provided with an ignition plug 27 configured to ignite the air-fuel mixture in the combustion chamber 23. The ignition plugs 27 are attached to a top portion of the cylinder head 22.

The intake ports of the cylinders are connected to a surge tank 18 via branch pipes for the cylinders. An intake pipe 10 is connected to an upstream side portion of the surge tank 18, and an air cleaner 19 is disposed at an upstream end of the intake pipe 10. Further, an air flow meter 15 configured to detect an intake air amount, and an electronically-controlled throttle valve 13 are disposed on the intake pipe 10 in this order from the upstream side.

The intake port of each cylinder is provided with a fuel injection valve 12 configured to inject fuel into the intake port. The fuel injected from the fuel injection valve 12 is mixed with the intake air to form an air-fuel mixture, The air-fuel mixture is taken into each combustion chamber 23 while the intake valve Vi is open, is compressed by the piston 24, and is then ignited by the ignition plug 27 to be burned, in place of the fuel injection valve 12 configured to inject the fuel into the intake port, a fuel injection valve configured to inject the fuel directly into the cylinder may be provided. Alternatively, both a fuel injection valve configured to inject the fuel into the intake port and a fuel injection valve configured to inject the fuel directly into the cylinder may be provided.

The exhaust ports of the cylinders are connected to an exhaust pipe 30 via branch pipes for the cylinders. The three-way catalyst 31 is disposed on the exhaust pipe 30. The three-way catalyst 31 has an oxygen storage ability, and reduces NOx, HC and CO. The three-way catalyst 31 is produced by forming at least one catalyst layer including a catalyst support, such as alumina ($Al_2O_3$), and a catalyst metal, such as platinum (Pt), palladium (Pd), or rhodium (Rh) supported on the catalyst support, on a base material, such as cordierite, in particular, a honeycomb base material. The three-way catalyst 31 is an example of a catalyst configured to clean exhaust gas discharged from the cylinders of the engine 20. The three-way catalyst 31 may be an oxidation catalyst or a gasoline particulate filter coated with an oxidation catalyst.

An air-fuel ratio sensor 33 configured to detect an air-fuel ratio of the exhaust gas is disposed upstream of the three-way catalyst 31. The air-fuel ratio sensor 33 is a so-called wide-range air-fuel ratio sensor. The air-fuel ratio sensor 33 can continuously detect air-fuel ratios within a relatively wide range. The air-fuel ratio sensor 33 is configured to output a signal indicating a value proportional to the detected air-fuel ratio.

The engine system 1 includes an electronic control unit (ECU) 50. The ECU 50 includes a central processing unit (CPU), a random-access memory (RAM), a read-only memory (ROM), a storage device and so forth. The ECU 50 controls the engine 20 by executing programs stored in the ROM and the storage device. The ECU 50 is an example of a control apparatus for the engine 20. The ECU 50 executes a temperature-increasing process, a detection process, a determination process, gradually-changing-and-stopping process, a promptly-stopping process, and a calculation process, which will be described later. These processes are executed by a temperature-increasing processing unit, a detection processing unit, a determination processing unit, a gradually-changing-and-stopping processing unit, a promptly-stopping processing unit, and a calculation processing unit of the ECU 50, which are functionally achieved by the CPU, the ROM, and the RAM. The details will be described later.

The ignition plugs 27, the throttle valve 13, the fuel injection valves 12 and so forth are electrically connected to the ECU 50. Further, an accelerator operation amount sensor 11 configured to detect an accelerator operation amount, a throttle opening amount sensor 14 configured to detect an opening amount of the throttle valve 13, the air flow meter 15 configured to detect an intake air amount, the air-fuel ratio sensor 33, a crank angle sensor 25 configured to detect a crank angle of a crankshaft of the engine 20, a coolant temperature sensor 29 configured to detect a temperature of a coolant for the engine 20, and various other sensors are electrically connected to the ECU 50 via analog-to-digital converters and so forth (not illustrated). The ECU 50 controls the ignition plugs 27, the throttle valve 13, the fuel injection valves 12 and so forth to control the ignition timings, the fuel injection amounts, the fuel injection timings, the throttle opening amount and so forth, based on, for example, detection values obtained by the various sensors, such that desired engine power is produced.

Next, a manner in which a target air-fuel ratio is set by the ECU 50 will be described. The target air-fuel ratio is set based on an operation state of the engine 20 when the temperature-increasing process (described later) has been stopped. For example, when an operation state of the engine 20 is in a low-speed-rotation-and-low-load region, the target air-fuel ratio is set to the stoichiometric air-fuel ratio. On the other hand, when an operation state of the engine 20 is in a high-speed-rotation-and-high-load region, the target air-fuel ratio is set to an air-fuel ratio that is richer (lower) than the stoichiometric air-fuel ratio. After the target air-fuel ratio is set, the fuel injection amount for each cylinder is subjected to feedback control such that the air-fuel ratio detected by the air-fuel ratio sensor 33 coincides with the target air-fuel ratio. In this specification, a target air-fuel ratio means a target air-fuel ratio that is set based on an operation state of the engine 20 during stop of the temperature-increasing process, unless otherwise noted.

The ECU 50 executes the temperature-increasing process of increasing the temperature of the three-way catalyst 31 to a value within a prescribed temperature region. In the temperature-increasing process, so-called dither control is executed. In the dither control, an air-fuel ratio in one cylinder of a plurality of cylinders is adjusted to a rich air-fuel ratio that is lower than the stoichiometric air-fuel ratio, and an air-fuel ratio in each of the remaining three cylinders is adjusted to a lean air-fuel ratio that is higher than the stoichiometric air-fuel ratio. Specifically, in the control of the air-fuel ratios in the temperature-increasing process, the air-fuel ratio in one cylinder is adjusted to a rich air-fuel ratio by correcting the fuel injection amount such that the fuel injection amount is increased by a prescribed rate (percentage) with respect to the fuel injection amount corresponding to the target air-fuel ratio, whereas the air-fuel ratio in each of the remaining cylinders is adjusted to a lean air-fuel ratio by correcting the fuel injection amount such that the fuel injection amount is decreased by a prescribed rate (percentage) with respect to the fuel injection amount corresponding to the target air-fuel ratio. For example, the air-fuel ratio in one cylinder is adjusted to a rich air-fuel ratio by correcting the fuel injection amount such that the fuel injection amount is increased by 15% with respect to the fuel injection amount corresponding to the target air-fuel ratio, whereas the air-fuel ratio in each of the remaining cylinders is adjusted to a lean air-fuel ratio by correcting the fuel injection amount such that the fuel injection amount is decreased by 5% with respect to the fuel injection amount corresponding to the target air-fuel ratio. When the temperature-increasing process is executed as described above, excess fuel discharged from the cylinder in which the air-fuel ratio has been set to a rich air-fuel ratio adheres to the three-way catalyst 31, and is burned under a lean atmosphere created by the exhaust gas discharged from the cylinders in which the air-fuel ratio has been set to a lean air-fuel ratio. In this way, the temperature of the three-way catalyst 31 is increased.

In the temperature-increasing process, the control is executed such that the average of the air-fuel ratios in all the cylinders is adjusted to the stoichiometric air-fuel ratio. However, the average of the air-fuel ratios in all the cylinders need not be adjusted to the stoichiometric air-fuel ratio, as long as the average of the air-fuel ratios in all the cylinders is adjusted to a value within a prescribed range including the stoichiometric air-fuel ratio such that the temperature of the three-way catalyst 31 can be increased. For example, a rich air-fuel ratio is an air-fuel ratio within a range from 9 to 12, and a lean air-fuel ratio is an air-fuel ratio within a range from 15 to 16. The air-fuel ratio in at least one of the cylinders needs to be set to a rich air-fuel ratio, and the air-fuel ratio in each of the remaining cylinders needs to be set to a lean air-fuel ratio.

Further, the ECU 50 executes the detection process of detecting a degree of variation (referred also to as "imbalance") among the air-fuel ratios in the cylinders. When the degree of variation among the air-fuel ratios in the cylinders is higher, a variation rate, that is, a slope of the detection value obtained by the air-fuel ratio sensor 33 increases. That is, the degree of variation in the air-fuel ratio of the exhaust gas is reflected in the slope of the detection value obtained by the air-fuel ratio sensor 33. Therefore, in the detection process, the detection value obtained by the air-fuel ratio sensor 33 is monitored over a prescribed time period, and the degree of the slope of the detection value is detected as the degree of variation. For example, the ECU 50 determines, based on the detection result, whether some sort of malfunction has occurred in the engine 20.

Depending on, for example, the operation state of the engine 20, the degree of variation among the air-fuel ratios may inevitably become high even when the engine 20 is operating normally. When the detection process is executed in such a state, there is a possibility that it will be determined, based on the high degree of variation among the air-fuel ratios, that some sort of malfunction has occurred in the engine 20 although the engine 20 is operating normally. This may reduce the reliability of the detection result obtained through the detection process. In view of this, a plurality of detection preconditions for executing the detection process is set in advance, and the detection process is executed when all the detection preconditions are satisfied.

The temperature-increasing process intentionally increases the degree of variation among the air-fuel ratios in the cylinders. Therefore, when the temperature-increasing process and the detection process are concurrently executed, there is a possibility that the degree of variation among the air-fuel ratios will be detected to be high even when the engine 20 is operating normally. In view of this, in order to prevent the temperature-increasing process and the detection process from being concurrently executed, temperature-increasing preconditions for executing the temperature-increasing process include a condition that the detection process has been stopped (i.e. a condition that the detection process is not being executed), and the detection preconditions include a condition that the temperature-increasing process has been stopped (i.e., a condition that the temperature-increasing process is not being executed) (this condition will be referred to as "stopped condition" where appropriate).

The detection preconditions other than the condition that "the temperature-increasing process has been stopped" include, for example, a condition that warm-up of the engine 20 has been completed, a condition that the operation state of the engine 20 is not a transition operation state, such as a sudden acceleration state or a sudden deceleration state, a condition that the engine speed of the engine 20 and the throttle opening amount are each within a prescribed range, a condition that the air-fuel ratio feedback control is being executed based on a detection value from the air-fuel ratio sensor 33, a condition that fuel supply cutoff is not being executed, a condition that the voltage of the battery has not been decreased, and a condition that the amount of vaporized fuel gas generated in a fuel tank and introduced into the intake pipe 10 is within a prescribed range.

Figure 2A:
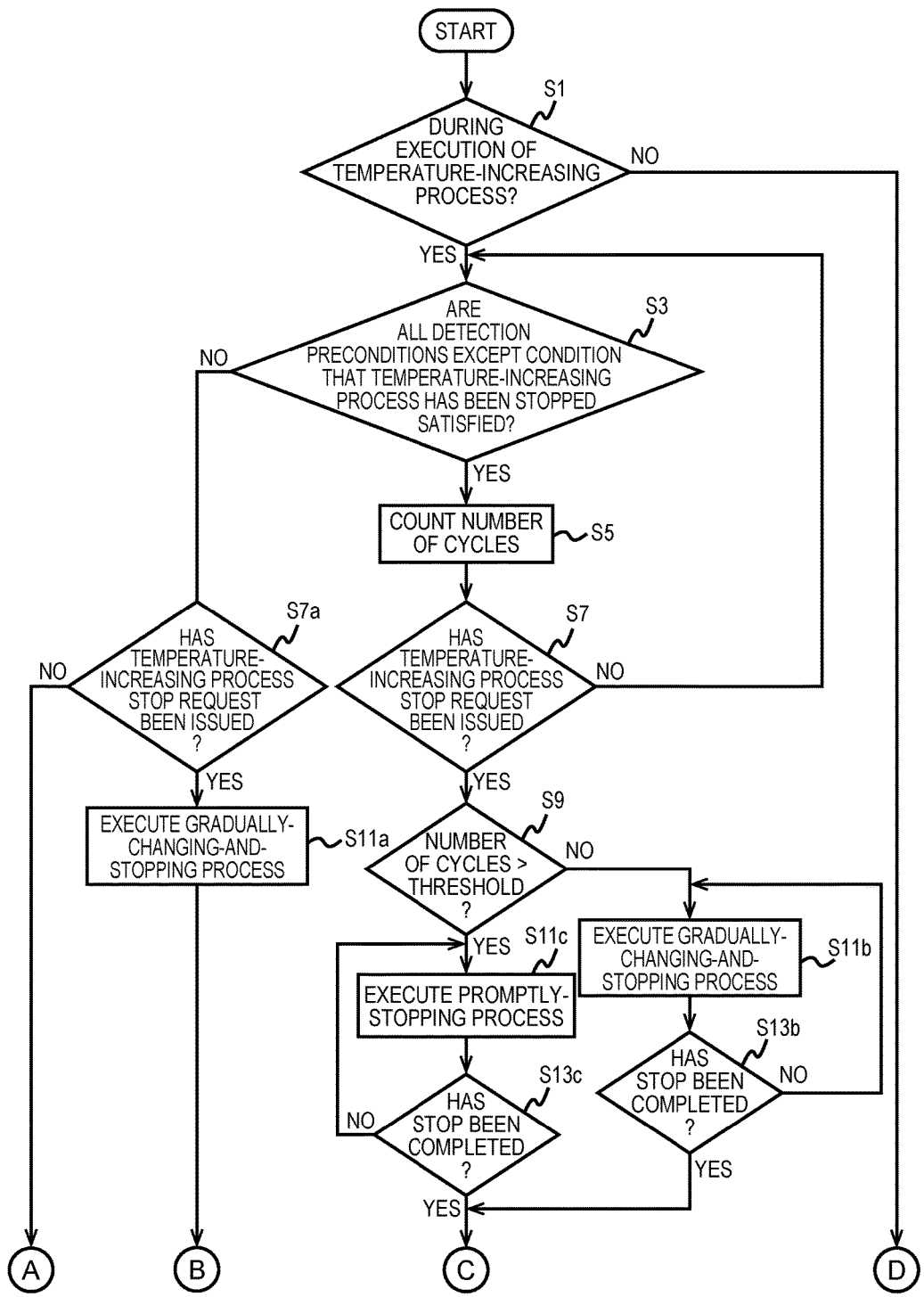
FIG. 2A is a flowchart illustrating an example of control executed by an electronic control unit (ECU)

FIG. 2A and FIG. 2B are a flowchart illustrating an example of control executed by the ECU 50. The process illustrated in the flowchart in FIG. 2A and FIG. 2B is repeatedly executed at prescribed time intervals. First, the ECU 50 determines whether the temperature-increasing process is being executed (step S1). When the ECU 50 makes a negative determination, the ECU 50 executes processes in step S19 and subsequent steps. The processes in step S19 and the subsequent steps will be described later.

When the ECU 50 makes an affirmative determination, the ECU 50 determines whether all the detection preconditions except the condition that "the temperature-increasing process has been stopped" are satisfied (step S3). The state where an affirmative determination is made in step S3 is a state where the detection process can be executed if the temperature-increasing process that is being executed is stopped. On the other hand, the state where a negative determination is made in step S3 is a state where, even if the temperature-increasing process that is being executed is stopped, the detection process cannot be executed unless all the remaining detection preconditions are satisfied. The process in step S3 is an example of a process executed by the determination processing unit that is included in the ECU 50 and that is configured to determine whether all the detection preconditions except the condition that the temperature-increasing process has been stopped are satisfied, during execution of the temperature-increasing process.

When the ECU 50 makes a negative determination in step S3, the ECU 50 determines whether a request to stop the temperature-increasing process has been issued (step S7a). A request to stop the temperature-increasing process is issued, for example, when the temperature of the three-way catalyst 31 reaches a desired temperature through the temperature-increasing process. The temperature of the three-way catalyst 31 may be acquired by a sensor, or may be estimated based on an intake air amount and a rich air-fuel ratio and a lean air-fuel ratio to which the air-fuel ratios in the cylinders are adjusted during execution of the temperature-increasing process. When the ECU 50 makes a negative determination in step S7a, the control ends.

When the ECU 50 makes an affirmative determination in step S7a, the ECU 50 executes the gradually-changing-and-stopping process (step S11a), and the control ends. The gradually-changing-and-stopping process is a process of stopping the temperature-increasing process by gradually changing the air-fuel ratio in each cylinder from a rich air-fuel ratio or a lean air-fuel ratio, to which the air-fuel ratio is adjusted during the temperature-increasing process, to the target air-fuel ratio stepwise or continuously over a prescribed time period. In this way, the air-fuel ratio in each cylinder is gradually changed over the prescribed time period, and thus the occurrence of a torque shock is reduced. Moreover, since a negative determination is made in step S3, the detection process cannot be executed even if the temperature-increasing process is stopped. Therefore, execution of the gradually-changing-and-stopping process described above does not exert influence on an execution time period of the detection process. The process in step S11a is an example of a process executed by the gradually-changing-and-stopping processing unit that is included in the ECU 50 and that is configured to execute the gradually-changing-and-stopping process when a negative determination is made by the determination processing unit in step S3 and a request to stop the temperature-increasing process has been issued. The gradually-changing-and-stopping process is a process of stopping the temperature-increasing process by gradually changing the air-fuel ratios in the cylinders to the target air-fuel ratio that is set based on the operation state of the engine 20 after the stop of the temperature-increasing process.

When the ECU 50 makes an affirmative determination in step S3, the ECU 50 starts counting the number of cycles of the engine 20 from when an affirmative determination is made in step S3 (step S5). Specifically, the ECU 50 counts the number of cycles based on a detection value from the crank angle sensor 25. Next, the ECU 50 determines whether a request to stop the temperature-increasing process has been issued (step S7). When the ECU 50 makes a negative determination, the ECU 50 executes the processes in step S3 and the subsequent steps again. That is, the ECU 50 continues to count the number of cycles over a time period over which all the detection preconditions except the condition that "the temperature-increasing process has been stopped" are satisfied and a request to stop the temperature-increasing process has not been issued. The number of cycles counted by the ECU 50 means a time period over which the detection process is prevented from being executed because only the condition that "the temperature-increasing process has been stopped" is not satisfied.

When the ECU 50 makes an affirmative determination in step S7, the ECU 50 determines whether the number of cycles exceeds a threshold set in advance (step S9). The case where the number of cycles exceeds the threshold means that the time period over which the detection process is prevented from being executed because only the condition that "the temperature-increasing process has been stopped" is not satisfied is relatively long. Conversely, the case where the number of cycles is equal to or less than the threshold means that the time period described above is relatively short.

Therefore, when the ECU 50 makes a negative determination in step S9, the ECU 50 executes the gradually-changing-and-stopping process (step S11*b*), as in step S11*a*, for the following reason. When the time period over which the detection process is prevented from being executed because only the condition that "the temperature-increasing process has been stopped" is not satisfied is relatively short, a sufficiently long execution time period of the detection process can be secured even if the detection process i.s started after the temperature-increasing process comes to a stop over a time period set in advance in view of reduction of the occurrence of a torque shock.

Next, the ECU 50 determines whether the stop of the temperature-increasing process has been completed (step S13*b*). Specifically, the ECU 50 determines that the stop of the temperature-increasing process has been completed, when the air-fuel ratios in all the cylinders are set to the same target air-fuel ratio. When the ECU 50 makes a negative determination, the ECU 50 continues the gradually-changing-and-stopping process, whereas when the ECU 50 makes an affirmative determination, the ECU 50 executes a process in step S15 (described later).

When the ECU 50 makes an affirmative determination in step S9, the ECU 50 executes the promptly-stopping process (step S11*c*). The promptly-stopping process is a process of promptly stopping the temperature-increasing process by changing the air-fuel ratio in each cylinder from a rich air-fuel ratio or a lean air-fuel ratio, to which the air-fuel ratio is adjusted during the temperature-increasing process, to the target air-fuel ratio within a time period that is shorter than the time period of the gradually-changing-and-stopping process. In this case, a normal operation state can be resumed within a short time period, and thus the detection process can be started more promptly than when the gradually-changing-and-stopping process is executed for the following reason. When the time period over which the detection process is prevented from being executed because only the condition that "the temperature-increasing process has been stopped" is not satisfied is relatively long, it is desirable to secure a sufficiently long execution time period of the detection process by stopping the temperature-increasing process as promptly as possible upon issuance of a request to stop the temperature-increasing process to execute the detection process. The process in step S11*c* is an example of a process executed by the promptly-stopping processing unit that is included in the ECU 50 and that is configured to execute the promptly-stopping process when an affirmative determination is made by the determination processing unit in step S3 and a request to stop the temperature-increasing process has been issued. The promptly-stopping process is a process of stopping the temperature-increasing process by changing the air-fuel ratios in the cylinders to the target air-fuel ratio within a time period that is shorter than the time period of the gradually-changing-and-stopping process.

Next, the ECU 50 determines whether the stop of the temperature-increasing process has been completed (step S13*c*). A concrete determination method is the same as that in step S13*b*. When the ECU 50 makes a negative determination, the ECU 50 continues the promptly-stopping process, whereas when the ECU 50 makes an affirmative determination, the ECU 50 executes the following processes.

The ECU 50 calculates a delay period [msec] that is a time period from when the ECU 50 determines that the stop of the temperature-increasing process has been completed until when the ECU 50 starts the detection process (step S15). Then, the ECU 50 determines whether the delay period has elapsed after the ECU 50 determines that the stop of the temperature-increasing process has been completed (step S17). The ECU 50 repeatedly executes the process in step S17 until an affirmative determination is made in step S17. When the ECU 50 makes an affirmative determination in step S17, the ECU 50 determines whether all the detection preconditions are satisfied (step S19), When the ECU 50 makes a negative determination in step S19, the control ends without execution of the detection process, whereas when the ECU 50 makes an affirmative determination, the ECU 50 starts execution of the detection process (step S21). The process in step S15 is an example of a process executed by the calculation processing unit that is included in the ECU 50 and that is configured to calculate the delay period that is a time period from when the ECU 50 determines that the stop of the temperature-increasing process has been completed until when the ECU 50 starts the detection process. The process in step S21 is an example of a process executed by the detection processing unit that is included in the ECU 50 and that is configured to execute the detection process when all the detection preconditions including the condition that the temperature-increasing process has been stopped are satisfied. The detection process is a process of detecting a degree of variation among the air-fuel ratios in the cylinders.

The delay period will be described below. It is considered that, immediately after the stop of the temperature-increasing process, the variation in the air-fuel ratio of the exhaust gas is still large due to the influence of the temperature-increasing process executed until the stop of the temperature-increasing process. Therefore, the delay period is set, and the detection process is started in a case where all the detection preconditions are satisfied when the delay period has elapsed from a time immediately after completion of the stop of the temperature-increasing process, at which the influence of the temperature-increasing process remains. Thus, at the time when the influence of the temperature-increasing process becomes small, the detection process is started, so that the influence of the temperature-increasing process on the detection process can be further reduced.

Figure 3:
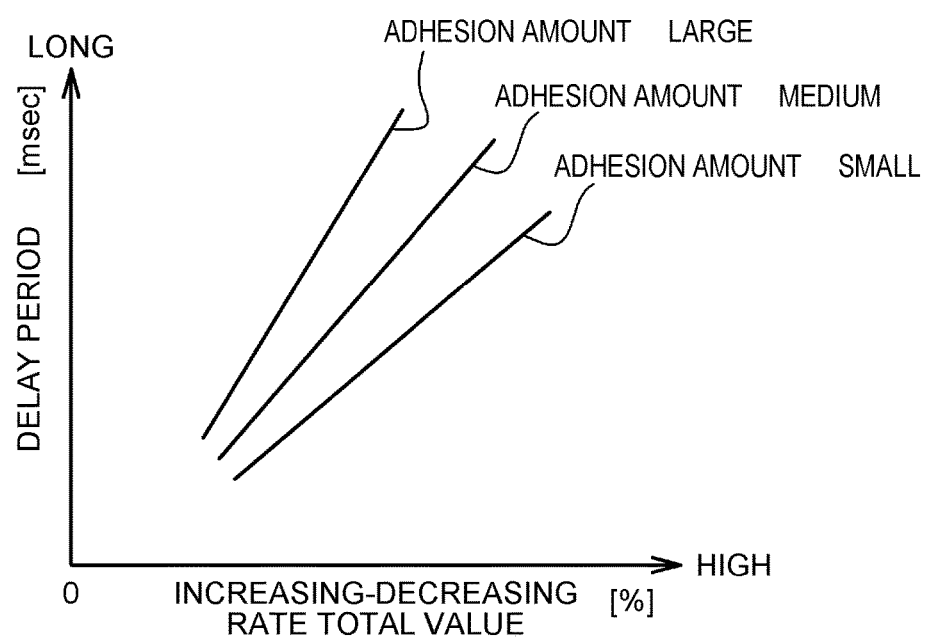
FIG. 3 is an example of a map that is referred to when a delay period is calculated.

FIG. 3 is an example of a map that is referred to when the delay period is calculated. This map is created in advance through experiments, and then stored in the ROM of the ECU 50. This map is set such that the delay period is calculated to be longer as an increasing-decreasing rate total value [%] of the air-fuel ratios in the temperature-increasing process immediately before resumption of the normal operation state is higher, and as an amount of fuel adhering to the inner wall surface of the engine 20 (inner wall surface of each combustion chamber) at the stop time of the temperature-increasing process is larger.

The increasing-decreasing rate total value is the sum of a rate (percentage) by which the fuel injection amount is corrected to be increased in order to adjust the air-fuel ratio to a rich air-fuel ratio in the temperature-increasing process and. a rate (percentage) by which the fuel injection amount is corrected to be decreased in order to adjust the air-fuel ratio to a lean air-fuel ratio in the temperature-increasing process, For example, when a rich air-fuel ratio is achieved in one cylinder by correcting the fuel injection amount such that the fuel injection amount is increased by 15% and a lean air-fuel ratio is achieved in each of the remaining three cylinders by correcting the fuel injection amount such that the fuel injection amount is decreased by 5%, the increasing-decreasing rate total value is 20%, which is the sum of 15% and 5%. Immediately after the temperature-increasing process is stopped, the air-fuel ratio of the exhaust gas passing through the vicinity of the air-fuel ratio sensor 33 may still be significantly varying due to the influence of the temperature-increasing process. Moreover, it is considered that, as the increasing-decreasing rate total value immediately before the stop of the temperature-increasing process is higher, the variation in the air-fuel ratio of the exhaust gas immediately after the stop of the temperature-increasing process is larger, and a relatively long time is required for the variation to become small. Therefore, the delay period is calculated to be longer as the increasing-decreasing rate total value immediately before the stop of the temperature-increasing process is higher. The increasing-decreasing rate total value is the sum of an increasing-correction rate and a decreasing-correction rate for respectively achieving a rich air-fuel ratio and a lean air-fuel ratio, and thus the increasing-decreasing rate total value is correlated with a difference between the rich air-fuel ratio and the lean air-fuel ratio during execution of the temperature-increasing process. Therefore, the increasing-decreasing rate total value is an example of an air-fuel ratio parameter that is correlated with the difference between the rich air-fuel ratio and the lean air-fuel ratio during execution of the temperature-increasing process.

As described above, the delay period is calculated to be longer as the amount of fuel adhering to the inner wall surface of the engine 20 (hereinafter, referred to as "adhesion amount of fuel" where appropriate) at the stop time of the temperature-increasing process is larger, for the following reason. As the amount of fuel adhering to the inner wall surface is larger, the variation in the air-fuel ratio of the exhaust gas may become larger because the fuel adhering to the inner wall surface is burned immediately after the stop of the temperature-increasing process and the actual air-fuel ratio becomes richer (lower) than the target air-fuel ratio immediately after the stop of the temperature-increasing process. In particular, a large amount of fuel may adhere to the cylinder in which the air-fuel ratio is adjusted to a rich air-fuel ratio during execution of the temperature-increasing process and to the inner wall surface of the intake port for this cylinder. Therefore, the delay period is set in consideration of a time period that is required for the variation in the air-fuel ratio of the exhaust gas to become small. The variation in the air-fuel ratio of the exhaust gas is caused by the fuel adhering to the inner wall surface immediately after the stop of the temperature-increasing process.

The adhesion amount of fuel is estimated based on the intake air amount and the temperature of the coolant. The adhesion amount of fuel is estimated to be smaller as the intake air amount is larger and as the temperature of the coolant is higher, for the following reasons. As the intake air amount is larger, the injected fuel flow into the combustion chambers 23 more easily due to a fast flow of the intake air and vaporization of the fuel adhering to the wall surfaces is promoted. As the temperature of the coolant is higher, vaporization of injected fuel is promoted due to the heat of the engine 20. Each of the intake air amount and the temperature of the coolant is an example of an adhesion amount parameter that is correlated with the amount of fuel adhering to the inner wall surface of the engine 20. The intake air amount and the temperature of the coolant are respectively calculated based on a detection value from the air flow meter 15 and a detection value from the coolant temperature sensor 29, The method of estimating an adhesion amount of fuel may be any other method. The delay period may be calculated based on a calculation expression, instead of being calculated based on the map as described above.

When execution of the detection process is started, the ECU 50 determines whether the detection process has been completed (step S23). Specifically, the ECU 50 determines that the detection process has been completed, when the detection process is continuously executed over a prescribed number of cycles. When the ECU 50 makes a negative determination in step S23, the ECU 50 determines whether all the detection preconditions are satisfied (step S25). When all the detection preconditions are satisfied, the ECU 50 continues the detection process. When the ECU 50 makes an affirmative determination in step S23 or When the ECU 50 makes a negative determination in step S25, the ECU 50 stops the detection process (step S27).

When the ECU 50 makes a negative determination in step S1, the ECU 50 executes the processes in step S19 and the subsequent steps. When all the detection preconditions are satisfied, the ECU 50 executes the detection process (step S21). When at least one of the detection preconditions is unsatisfied, the control ends.

Figure 4:
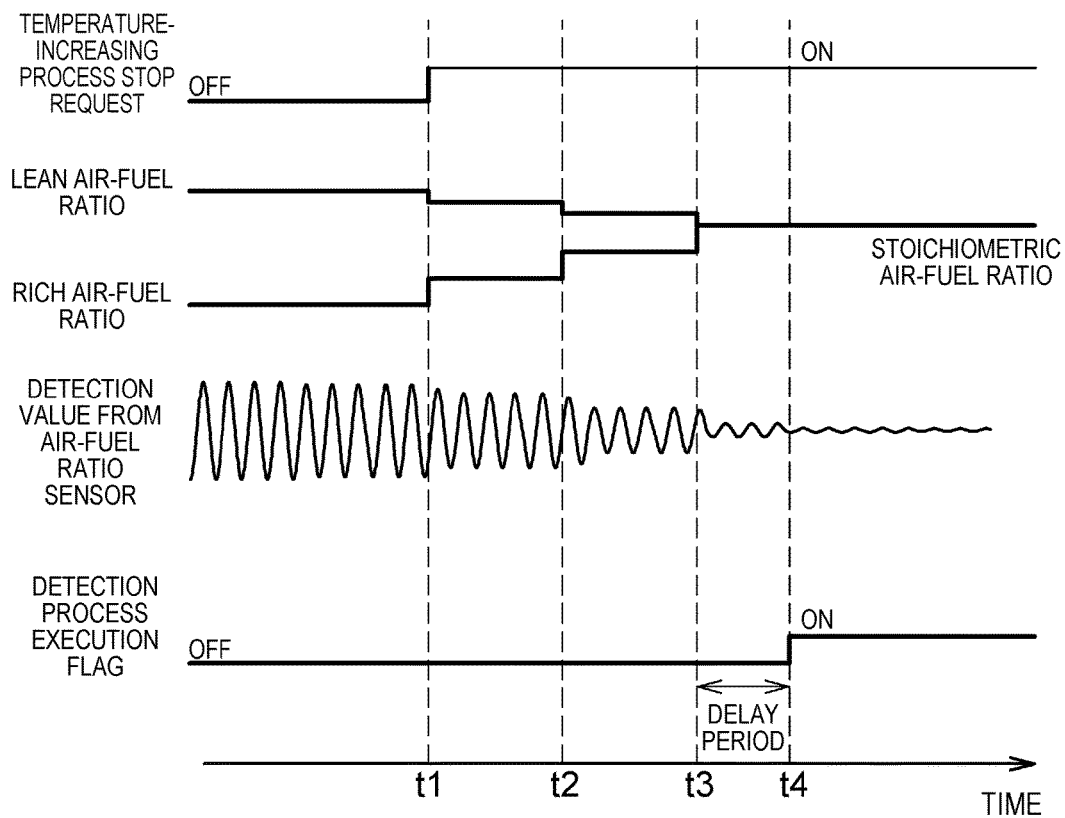
FIG. 4 is a time-series chart in a case where a detection process is executed after a gradually-changing-and-stopping process is executed.
Figure 5:
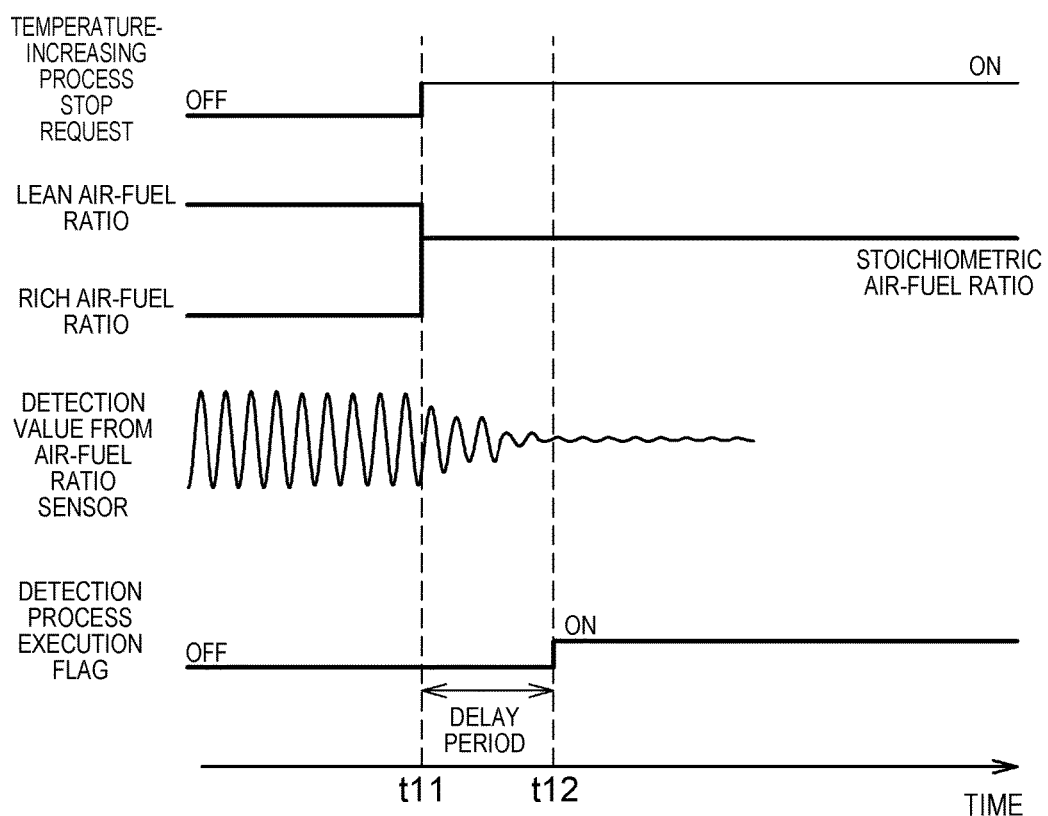
FIG. 5 is a time-series chart in a case where the detection process is executed after a promptly-stopping process is executed.

Next, description will be provided with reference to time-series charts regarding the cases Where the temperature-increasing process is stopped and then the detection process is executed. FIG. 4 is a time-series chart in a case where the detection process is executed after the gradually-changing-and-stopping process is executed. FIG. 5 is a time-series chart in a case where the detection process is executed after the promptly-stopping process is executed. Each of FIG. 4 and FIG. 5 indicates a stop request flag for the temperature-increasing process, air-fuel ratios in the cylinders, a detection value from the air-fuel ratio sensor 33, and an execution flag for the detection process. In each of the examples indicated in FIG. 4 and FIG. 5, the stoichiometric air-fuel ratio is used as the target air-fuel ratio to which the air-fuel ratio in each cylinder is adjusted after the temperature-increasing process is stopped.

First, the case where the gradually-changing-and-stopping process is executed will be described. As illustrated in FIG. 4, after the stop request flag for the temperature-increasing process is switched from OFF to ON at time t1, the air-fuel ratio in each cylinder is changed from a rich air-fuel ratio or a lean air-fuel ratio to the target air-fuel ratio stepwise at time t1, time t2, and time t3. For example, when the rich air-fuel ratio and the lean air-fuel ratio before time t1 are achieved respectively through 15% increasing-correction of the fuel injection amount and 5% decreasing-correction of the fuel injection amount, a rich air-fuel ratio and a lean air-fuel ratio during a time period from time t1 to time t2 are respectively achieved through 9% increasing-correction and 3% decreasing-correction, and a rich air-fuel ratio and a lean air-fuel ratio during a time period from time t2 to time t3 are respectively achieved through 4.5% increasing-correction and 1.5% decreasing-correction.

The air-fuel ratios are gradually changed as described above, so that variation in the detection value from the air-fuel ratio sensor 33 gradually decreases. When the air-fuel ratios in the cylinders are changed to the stoichiometric air-fuel ratio at time t3, it is determined that the stop of the temperature-increasing process has been completed, and a delay period is calculated. The delay period is calculated based on the increasing-decreasing rate total value immediately before time t3 at which the air-fuel ratios in the cylinders are changed to the stoichiometric air-fuel ratio, and the adhesion amount of fuel estimated at time t3. For example, when the rich air-fuel ratio and the lean air-fuel ratio during the time period from time t2 to time t3 are respectively achieved through 4.5% increasing-correction and 1.5% decreasing-correction, the delay period is calculated with reference to the map in FIG. 3, based on the increasing-decreasing rate total value, which is 6%, and the estimated adhesion amount of fuel. At time t4 that is a time point at which the delay period has elapsed from time t3, the execution flag for the detection process is switched from OFF to ON, so that the detection process is started.

When the air-fuel ratio in each cylinder is continuously changed from a rich air-fuel ratio or a lean air-fuel ratio to the target air-fuel ratio in the gradually-changing-and-stopping process, the delay period is calculated based on an increasing-decreasing rate total value at a time that is a prescribed time period prior to the time at which the stop of the temperature-increasing process is completed.

Next, the case where the promptly-stopping process is executed will be described. As illustrated in FIG. 5, after the stop request flag for the temperature-increasing process is switched from OFF to ON at time t11, the air-fuel ratio in each cylinder is immediately changed from a rich air-fuel ratio or a lean air-fuel ratio to the stoichiometric air-fuel ratio. When the air-fuel ratios in the cylinders are changed to the stoichiometric air-fuel ratio and the temperature-increasing process is stopped at time t11, a delay period is calculated. The delay period, which is calculated after the promptly-stopping process is executed, is calculated based on the increasing-decreasing rate total value immediately before time t11 at which the air-fuel ratios in the cylinders are changed to the stoichiometric air-fuel ratio, and the adhesion amount of fuel estimated at time t11. For example, when the rich air-fuel ratio and the lean air-fuel ratio before time t11 are achieved respectively through 15% increasing-correction of the fuel injection amount and 5% decreasing-correction of the fuel injection amount, the delay period is calculated with reference to the map in FIG. 3, based on the increasing-decreasing rate total value, which is 20%, and the estimated adhesion amount of fuel. At time t12 that is a time point at which the delay period has elapsed from time t11, the execution flag for the detection process is switched from OFF to ON, so that the detection process is started.

As described above, regardless of whether the gradually-changing-and-stopping process is executed or the promptly-stopping process is executed, the detection process is executed after the delay period elapses from the stop of the temperature-increasing process. Thus, the reliability of the detection result obtained through the detection process is sufficiently secured.

In step S5 and step S9, the number of cycles of the engine 20 is used. However, for example, the elapsed time may be counted in place of the number of cycles. In step S15 and step S17, the delay period after the stop of the temperature-increasing process is completed is calculated. However, the number of cycles of the engine 20 may be calculated in place of the delay period. In the foregoing embodiment, the delay period may be calculated only based on the increasing-decreasing rate total value without taking the adhesion amount of fuel into account.

As to the gradually-changing-and-stopping process in each of step S11a and step S11b, the air-fuel ratio may be changed from a rich air-fuel ratio or a lean air-fuel ratio to the target air-fuel ratio over a longer time period in the gradually-changing-and-stopping process in step S11a than in the gradually-changing-and-stopping process in step S11b. Unlike the case where step S11b is executed, the detection process is less likely to be executed after execution of step S11a. Hence, even when the gradually-changing-and-stopping process is executed over a relatively long time period, it is possible to sufficiently reduce the occurrence of a torque shock without exerting influence on an execution time period of the detection process.

In the foregoing embodiment, the promptly-stopping process is a process of immediately changing an air-fuel ratio in each cylinder to the target air-fuel ratio to stop the temperature-increasing process. However, the promptly-stopping process is not limited to this. As long as the temperature-increasing process is stopped more promptly through the promptly-stopping process than through the gradually-changing-and-stopping process, the promptly-stopping process may be a process of gradually changing an air-fuel ratio in each cylinder to the target air-fuel ratio continuously or stepwise as in the gradually-changing-and-stopping process. Thus, when the promptly-stopping process is executed, it is possible to secure a sufficiently long execution time period of the detection process while suppressing an increase in a torque shock.

In the foregoing embodiment, the processes in steps S5, S9, S11b and S13b may be omitted. In this case, when the ECU 50 makes an affirmative determination in each of step S3 and step S7, the promptly-stopping process is uniformly executed, and only when the ECU 50 makes a negative determination in step S3, the gradually-changing-and-stopping process is executed. That is, when a request to stop the temperature-increasing process is issued in a state where all the detection preconditions except the condition that "the temperature-increasing process has been stopped" are satisfied, the promptly-stopping process may be uniformly executed, for the following reason. In this case, the detection process can be executed as soon as the stop of the temperature-increasing process is completed, and a sufficiently long execution time period of the detection process can be secured by stopping the temperature-increasing process promptly. In this case, the processes in steps S5, S9, S11b and S13b are no longer necessary, and hence, processing load on the ECU 50 is reduced.

As to the step S15, the map or the calculation expression for calculating the delay period may be defined such that the delay period is calculated to be longer as any one of the increasing-correction rate and the decreasing-correction rate becomes higher, for the following reason. In the temperature-increasing process, the average of the air-fuel ratios in all the cylinders is basically controlled to be the stoichiometric air-fuel ratio as described above. Therefore, when one of the increasing-correction rate and the decreasing-correction rate is defined, the other one of the increasing-correction rate and the decreasing-correction rate is uniquely defined. Therefore, as one of the increasing-correction rate and the decreasing-correction rate is higher, the increasing-decreasing rate total value is higher. The increasing-correction rate is correlated with the difference between a rich air-fuel ratio and the target air-fuel ratio, and the decreasing-correction rate is correlated with the difference between a lean air-fuel ratio and the target air-fuel ratio. Hence, each of the increasing-correction rate and the decreasing-correction rate is an example of an air-fuel ratio parameter that is correlated with the difference between a corresponding one of a rich air-fuel ratio and a lean air-fuel ratio, and the target air-fuel ratio.

In the foregoing embodiment, the delay period is calculated based on the estimated adhesion amount of fuel. Alternatively, the delay period may be calculated based on an adhesion amount parameter correlated with the adhesion amount of Mel without estimating the adhesion amount of fuel. Specifically, the adhesion amount of fuel is correlated with the intake air amount and the temperature of the coolant as described above, and thus the delay period may be calculated using at least one of the intake air amount and the temperature of the coolant being as the adhesion amount parameter.

In the foregoing embodiment, a rich air-fuel ratio and a lean air-fuel ratio in the temperature-increasing process are achieved respectively through increasing-correction and decreasing-correction executed on the fuel injection amount at which the target air-fuel ratio is achieved. However, the method of achieving a rich air-fuel ratio and a lean air-fuel ratio is not limited to this. That is, in the temperature-increasing process, the target air-fuel ratio for one of the cylinders may be set directly to a rich air-fuel ratio, and the target air-fuel ratio for the remaining cylinders may be set directly to a lean air-fuel ratio. In this case as well, the map or the calculation expression for calculating the delay period is defined such that the delay period is calculated to be longer as the difference between a rich air-fuel ratio and a lean air-fuel ratio is larger or as the difference between the target air-fuel ratio and one of a rich air-fuel ratio and a lean air-fuel ratio is larger.

The processes in steps S15 and S17 may be omitted for the following reason. For example, when variation in the air-fuel ratio of the exhaust gas immediately after the stop of the temperature-increasing process through the promptly-stopping process does not exert influence on the detection process, it is desirable to immediately start the detection process.

While example embodiments of the disclosure have been described in detail, the disclosure is not limited to the foregoing example embodiments, and various modification and changes may be made to the foregoing example embodiments within the technical scope of the disclosure defined by the appended claims.

What is claimed is:

1. A control apparatus for an internal combustion engine, the control apparatus comprising an electronic control unit configured to:
   i) execute a temperature-increasing process that is a process of increasing a temperature of a catalyst configured to clean exhaust gas discharged from a plurality of cylinders of the internal combustion engine, by setting an air-fuel ratio in at least one cylinder of the plurality of cylinders to a rich air-fuel ratio that is lower than a stoichiometric air-fuel ratio, and setting an air-fuel ratio in the rest of the plurality of cylinders to a lean air-fuel ratio that is higher than the stoichiometric air-fuel ratio;
   ii) execute a detection process that is a process of detecting a degree of variation among the air-fuel ratios in the plurality of cylinders upon satisfaction of all of a plurality of detection preconditions, the plurality of detection preconditions including a condition that the temperature-increasing process has been stopped;
   iii) execute a determination process that is a process of determining whether all the detection preconditions except the condition that the temperature-increasing process has been stopped are satisfied, during execution of the temperature-increasing process;
   iv) execute a gradually-changing-and-stopping process when a negative determination is made in the determination process and a request to stop the temperature-increasing process has been issued, the gradually-changing-and-stopping process being a process of stopping the temperature-increasing process by gradually changing the air-fuel ratios in the plurality of cylinders to a target air-fuel ratio that is set based on an operation state of the internal combustion engine after stop of the temperature-increasing process; and
   v) execute a promptly-stopping process when an affirmative determination is made in the determination process and a request to stop the temperature-increasing process has been issued, the promptly-stopping process being a process of stopping the temperature-increasing process by changing the air-fuel ratios in the plurality of cylinders to the target air-fuel ratio within a shorter time period than a time period of the gradually-changing-and-stopping process.

2. The control apparatus according to claim 1, wherein the electronic control unit is configured to execute the determination process by determining whether all the detection preconditions except the condition that the temperature-increasing process has been stopped are satisfied during execution of the temperature-increasing process, and determining whether a time period over which all the detection preconditions except the condition that the temperature-increasing process has been stopped are continuously satisfied during execution of the temperature-increasing process is equal to or longer than a prescribed time period.

3. The control apparatus according to claim 1, wherein the electronic control unit is configured to calculate a delay period that is a time period from when the temperature-increasing process is stopped until when execution of the detection process is started, such that the delay period is longer as an air-fuel ratio parameter is larger, the air-fuel ratio parameter being a parameter correlated with at least one of a difference between the rich air-fuel ratio and the lean air-fuel ratio during execution of the temperature-increasing process and a difference between the target air-fuel ratio and one of the rich air-fuel ratio and the lean air-fuel ratio.

4. The control apparatus according to claim 3, wherein the electronic control unit is configured to calculate the delay period such that the delay period is longer as an. adhesion amount parameter is larger, the adhesion amount parameter being a parameter correlated with an amount of fuel adhering to an inner wall surface of the internal combustion engine.

\* \* \* \* \*